United States Patent [19]

Rosaen et al.

[11] 4,268,384
[45] May 19, 1981

[54] SPIN-OFF FILTER HEAD ASSEMBLY

[76] Inventors: Borje O. Rosaen, 4031 Thornoaks Dr.; Dale P. Fosdick, 3000 Hunting Valley Dr., both of Ann Arbor, Mich. 48104

[21] Appl. No.: 779,329

[22] Filed: Mar. 21, 1977

[51] Int. Cl.³ .............................................. B01D 35/14
[52] U.S. Cl. .................................... 210/133; 210/444; 210/DIG. 14; 210/DIG. 17
[58] Field of Search ............................... 210/438–440, 210/443, 444, 446–448, DIG. 17, 133, DIG. 14, 449, 310; 55/312–314, 503, 505

[56] References Cited

U.S. PATENT DOCUMENTS

| | | | |
|---|---|---|---|
| 2,955,712 | 10/1960 | Gutkowski | 210/444 X |
| 3,076,550 | 2/1963 | Wilhelm | 210/DIG. 17 X |
| 3,329,269 | 7/1967 | Niccum | 210/DIG. 17 |
| 3,524,552 | 8/1970 | Carmon | 210/444 X |
| 4,011,662 | 3/1977 | Davis et al. | 55/313 X |
| 4,067,812 | 1/1978 | Drori | 210/444 X |

FOREIGN PATENT DOCUMENTS 2436080  5/1975  Fed. Rep. of Germany ...... 210/440
1336796 11/1973  United Kingdom ................ 210/444

Primary Examiner—William A. Cuchlinski, Jr.
Attorney, Agent, or Firm—Gifford, VanOphem, Sheridan & Sprinkle

[57] ABSTRACT

A head assembly for a spin-off filter is provided and comprises a stamped housing having a closed top wall and an open bottom with a flange adapted to sealingly engage the spin-off filter. A tube extends through the housing and is secured to the housing by appropriate means, such as welding. A member is thereafter secured to the tube for detachable connection with the spin-off filter. The tube also includes fluid passage means formed therein so that one end of the tube forms a fluid outlet while the other end of the tube forms a fluid inlet for connection with a fluid system. Fluid flow into the fluid inlet is diverted by the fluid passage means through the spin-off filter and to the fluid outlet.

9 Claims, 5 Drawing Figures

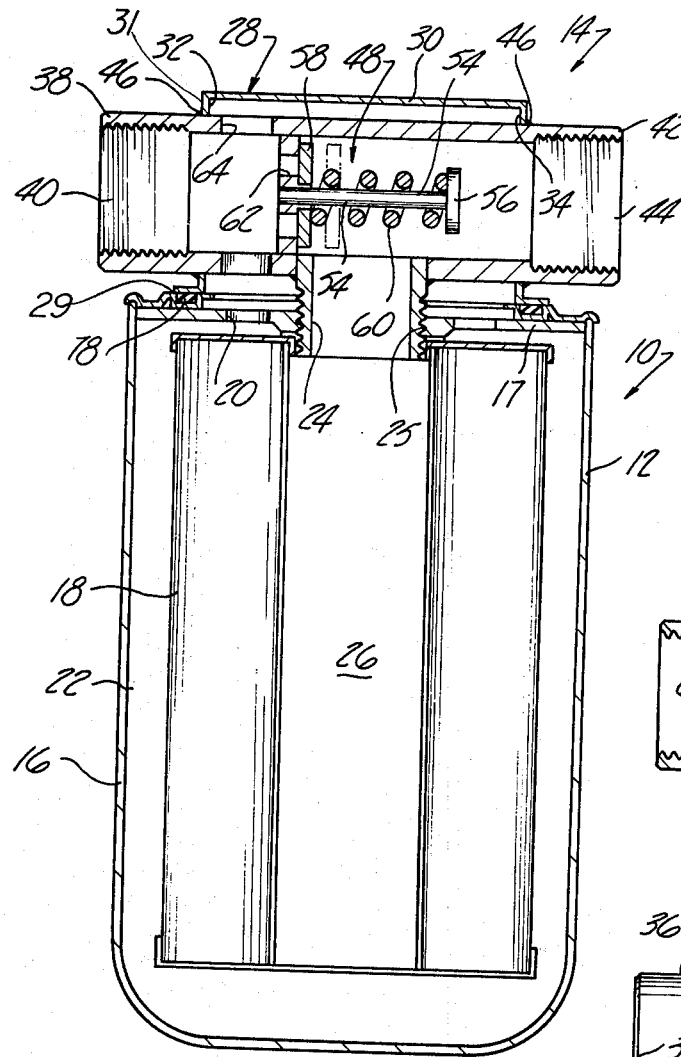
*Fig-1*
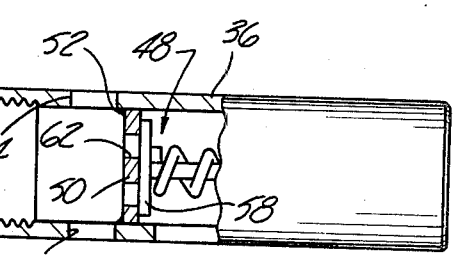
*Fig-2*
*Fig-3*
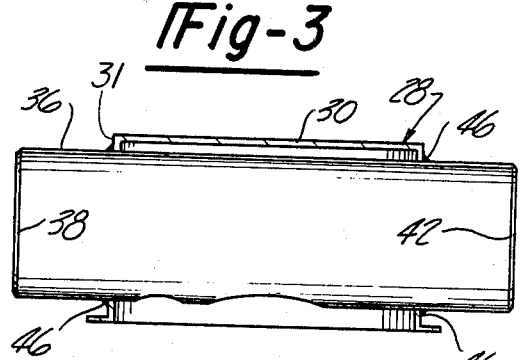
*Fig-4*
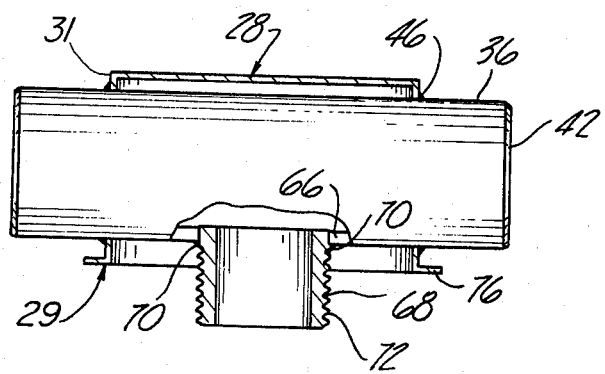
*Fig-5*

SPIN-OFF FILTER HEAD ASSEMBLY

BACKGROUND OF THE INVENTION

I. Field of the Invention

The present invention relates to a head assembly for a spin-off filter.

II. Description of the Prior Art

Spin-off filter assemblies are well known and widely utilized in fluid systems throughout industry. Such spin-off filter assemblies typically comprise a head having an inlet and outlet connected to the fluid system and a spin-off filter detachably connected to the head. With the spin-off filter connected to the head, fluid flow into the fluid inlet of the head is diverted through a filter element in the spin-off filter and passed to the fluid outlet of the head. Spin-off filters are so named because the spin-off filter can be easily screwed onto or off from the spin-off filter head.

These previously-known spin-off filter heads have been constructed by castings, typically from cast iron or cast aluminum. The castings, of course, define the routes and passageways through the filter head so that fluid flow into the inlet of the filter head is diverted to the filter and from the filter to the fluid outlet in the filter head.

These previously-known spin-off filter heads have proven both effective and durable in operation. Such previously-known heads, however, suffer the disadvantage that they are very expensive to manufacture since each head requires a separate casting. The castings, of course, are broken during the manufacturing operation.

SUMMARY OF THE PRESENT INVENTION

The present invention overcomes the above-mentioned disadvantage of the previously-known spin-off filter heads by providing such a head which is inexpensive to manufacture and yet durable in operation.

In brief, the spin-off filter head of the present invention comprises a stamped housing having a closed upper wall and an open bottom with a flange adapted to sealingly engage a spin-off filter. A tube extends entirely through the housing and is secured thereto by welding to prevent fluid leakage between the tube and the housing. A second tube intersects and is thereafter secured substantially perpendicularly to the first tube within the housing. The second tube is threaded for attachment with the spin-off filter.

One end of the first tube forms the fluid inlet to the spin-off filter head while the other end of the tube forms the fluid outlet. Additionally, fluid passage means are formed within the first and second tubes to divert the fluid flow from the fluid inlet in the head and to the inlet of the spin-off filter. The second tube, in turn, fluidly connects the filter outlet to the fluid outlet of the head.

Preferably, a simple and inexpensive bypass valve is welded within the first tube prior to its attachment to the housing. The bypass valve permits direct fluid communications between the fluid inlet and outlet of the head upon the attainment of a predetermined differential pressure across the spin-off filter element. This differential pressure, of course, would occur when the filter becomes clogged with impurities, debris, or the like.

As will be more fully understood as the description proceeds, the spin-off filter head according to the present invention is inexpensive to construct and yet durable and dependable in operation. Since the housing is formed by stamping and the remaining tubes or pipes are readily and commercially available, the previously-known necessity and expense of casting the spin-off filter head is totally obviated.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a side cross-sectional view showing a spin-off filter assembly utilizing the spin-off filter head of the present invention;

FIG. 2 is a perspective view showing the spin-off filter head of the present invention; and FIGS. 3–5 are partial sectional views illustrating the steps of manufacture of the spin-off filter head of the present invention.

DETAILED DESCRIPTION OF THE PRESENT INVENTION

With reference first to FIGS. 1 and 2, a spin-off filter assembly 10 is thereshown and comprises a spin-off filter 12 and a spin-off filter head 14. Typically the head 14 is coupled to a fluid system (not shown) while the filter 12 is detachably connected to the head 14 in a manner which will subsequently be described in greater detail.

The filter 12 is of conventional construction and includes an outer housing 16 having a circular top wall and a filter element 18 disposed within and carried by the housing 16. Fluid inlet ports 20 in the housing top wall 17 provide fluid communication to an outer annular inlet chamber 22 while a central fluid outlet port 24 in the housing top wall 17 provides fluid communication to a central cylindrical outlet chamber 26 circumscribed by the annular filter element 18. Thus, in a conventional fashion, the fluid flow into the inlet ports 20 of the housing 16 must pass through and be filtered by the filter element 18 prior to its exit from the filter 12 through the fluid outlet port 24. Moreover, the outlet port 24 includes internal threads 25 for attaching the filter 12 to the head 14, as will be subsequently described in greater detail.

The filter head 14, which forms the novelty of the instant invention, includes an annular housing 28 having a closed top wall 30, an annular sidewall 31, and is open at its bottom 29. The housing 28 is formed by stamping so that it can be easily, inexpensively, and readily manufactured. Additionally, the housing 28 includes a pair of apertures 32 and 34 formed in diametrically opposed sides of the sidewall 31 of the housing 28 so that the apertures 32 and 34 are in registry with each other. Preferably, the apertures 32 and 34 are formed in the housing 28 during the stamping process in which the housing 28 is formed.

With reference to FIGS. 1 and 3, a fluid bypass valve assembly 48 is secured within a length of pipe 36. The bypass valve assembly 48 includes a circular plate 50 having axial ports 62 secured by welds 52 within the interior of the pipe 36 so that the plate 50 sealingly engages the pipe 36 around its outer periphery. A stem 54 having a stop 56 at one end is press-fit or otherwise secured at its other end axially to the plate 50 so that the stem 54 is substantially parallel to the axis of the pipe 36. A disc-shaped valve member 58 is slidably disposed around the stem 54 so that one axial end of the valve member 58 can flatly abut against the plate 50 while a helical spring 60 under compression is disposed between the stop 56 and the other axial end of the valve member 58. Thus, the helical spring 60 normally urges the valve member 58 against the plate 50 to close the axial ports 62 in the plate 50 and prevent fluid flow therethrough. Preferably the entire bypass valve assembly 48 is preassembled and constructed prior to its attachment to the interior of the pipe 36.

With reference now to FIGS. 1 and 4, the pipe 36 with the attached bypass valve assembly 48 is disposed through the registering apertures 32 and 34 in the sidewall 31 so that a portion of the pipe 36 extends outwardly from the housing 28 from each aperture 32 and 34. A first end 38 of the pipe 36 includes internal threads 40 for connection with the fluid system and this end 38 forms the fluid inlet to the filter head 14. Likewise, the other end 42 of the pipe 36 includes internal threads 44 for connection to the fluid system and this end 42 forms the fluid outlet from the filter head 14. The pipe 36 is secured by welds 46 to the housing 28 which also prevents fluid leakage around the apertures 32 and 34.

At least one and preferably several radial apertures 64 are formed through the pipe 36 between the fluid inlet 40 and the plate 50. The apertures 64 provide fluid communication from the inlet 40 to the interior of the stamped housing 28.

With reference now to FIGS. 1 and 5, the pipe 36 also includes a radial aperture 66 between the plate 50 and the fluid outlet 44 with an axis substantially parallel and coaxial with the vertical axis of the housing 28. After the pipe 36 is secured to the housing 28, a second pipe 68 is inserted through the aperture 66 and secured to the pipe 36 by welds 70 so that the pipe 68 extends downwardly through the open bottom 32 of the housing 28. In addition, the pipe 68 includes external threads 72 which are adapted to threadably engage the internal threads 25 formed coaxially with the outlet port 24 of the filter 12. The filter 12 can thus be easily screwed onto or off from the pipe 68.

As best shown in FIGS. 1 and 5, the bottom 29 of the housing 28 includes an annular flange 76 adapted to abut against and sealingly engage a seal ring 78 annularly positioned around the top wall 17 of the filter housing 16. Thus, as the filter 12 is screwed onto the pipe 68, the housing flange 76 meets and abuts against the seal ring 78 so that the filter 12 is fluidly secured and sealed to the filter head 14.

Although the operation of the spin-off filter assembly 10 utilizing the improved filter head 14 of the present invention should be apparent, the operation will be summarized in the interest of clarity. With reference to FIG. 1 and assuming the head 14 is coupled by its inlet 40 and outlet 44 to an appropriate fluid system, fluid flow into the fluid inlet 40 passes through the radial ports 64 and into the interior of the housing 28. From the interior of the housing 28 the fluid passes downwardly through the inlet ports 24 in the upper wall 17 of the filter housing 16 and into the outer annular chamber 22 around the filter element 18.

The fluid is filtered as it flows through the filter element 18 and into the central chamber 26 of the filter 12 from which the fluid passes upwardly through the pipe 68 and to the fluid outlet 44 of the head 14. During this entire operation, the helical spring 60 of the bypass valve assembly 48 urges the valve member 58 against the plate 50 thereby closing fluid communication through the axial ports 62 in the plate 50.

In the well-known fashion, as dirt and debris accumulates on the filter element 18, the differential pressure between the filter chambers 22 and 26, and hence, between the filter inlet 40 and outlet 44 increases. When the differential pressure increases beyond a predetermined amount, representative of a predetermined degree of clogging of the filter element 18, the differential pressure between the fluid inlet 40 and outlet 44 overcomes the force of the helical spring 60 and moves the valve member 58 away from the plate 50 to the position indicated in phantom line in FIG. 1. This movement of the valve member 58, of course, permits direct fluid communication from the fluid inlet 40 to the fluid outlet 44 through the ports 62 in the plate member 50, thereby bypassing the filter 12.

The filter head, according to the present invention, has proven to be durable and long lasting in operation. Moreover, as previously mentioned, the filter head 14 is appreciably less expensive to manufacture than the previously-known cast filter heads while enjoying the same durability and dependability of operation.

Other alterations and modifications to the head 14 of the present invention will, of course, be apparent to those skilled in the art to which it pertains without deviation from the spirit of the invention as defined by the scope of the appended claims.

I claim:

1. A head for a spin-off filter comprising:
   a stamped housing, said housing having an annular sidewall, a closed top wall and being open at its bottom, said housing having means formed along its bottom adapted to sealingly engage a spin-off filter;
   a first tubular cylindrical pipe extending through the sidewalls of said housing wherein one end of the first pipe forms a fluid inlet while the other end of the first pipe forms a fluid outlet;
   means for sealing said first pipe to said housing;
   a second tubular cylindrical pipe positioned in an aperture formed through said first pipe, said second pipe being fixedly secured to said first pipe so that said second pipe extends downwardly through the open bottom of said housing;
   means formed on the free end of the second pipe for detachable connection with the spin-off filter; and
   fluid passage means formed through said first pipe for diverting fluid flow into the fluid inlet through the spin-off filter and from the filter to said fluid outlet.

2. The invention as defined in claim 1 and including means attached to said first pipe for bypassing said fluid passage means to permit direct fluid communication from said fluid inlet to said fluid outlet at a predetermined differential pressure between said fluid inlet and said fluid outlet.

3. The invention as defined in claim 2 wherein said bypass means is secured to and contained within the interior of said first pipe.

4. The invention as defined in claim 3 wherein said bypassing means further comprises,
   a plate secured across the interior of said first pipe and having at least one aperture formed therethrough,
   a valve member adapted to abut against said plate on the side of said plate adjacent the fluid outlet to thereby prevent fluid flow through said aperture in said plate, and means for urging said valve member against said plate.

5. The invention as defined in claim 4 wherein said plate is welded around its outer periphery to the interior of said first pipe to sealingly secure the plate to the first pipe.

6. The invention as defined in claim 3 wherein said bypass means is secured within said first pipe prior to attaching said pipe to said first housing.

7. The invention as defined in claim 1 wherein said sealing means comprise a continuous weld between said first pipe and said housing.

8. The invention as defined in claim 1 wherein said detachable connection means comprises a threaded portion on said second pipe adapted to threadably engage a threaded portion on the filter.

9. The invention as defined in claim 8 wherein said housing includes an annular flange formed along its bottom which is adapted to sealingly engage the filter.

* * * * *